United States Patent
Orihara et al.

(10) Patent No.: US 10,236,557 B2
(45) Date of Patent: Mar. 19, 2019

(54) ELECTRONIC DEVICE AND ANTENNA DEVICE

(71) Applicant: DEXERIALS CORPORATION, Tokyo (JP)

(72) Inventors: Katsuhisa Orihara, Tochigi (JP); Norio Saito, Tochigi (JP); Akihiro Fukuda, Tochigi (JP); Hiroyuki Ryoson, Tochigi (JP); Masayoshi Kanno, Tochigi (JP); Masahiro Kobo, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 14/436,413

(22) PCT Filed: Oct. 16, 2013

(86) PCT No.: PCT/JP2013/078086
§ 371 (c)(1),
(2) Date: Apr. 16, 2015

(87) PCT Pub. No.: WO2014/061704
PCT Pub. Date: Apr. 24, 2014

(65) Prior Publication Data
US 2015/0288054 A1 Oct. 8, 2015

(30) Foreign Application Priority Data

Oct. 17, 2012 (JP) .................................. 2012-230266
Feb. 6, 2013 (JP) .................................. 2013-021617

(51) Int. Cl.
*H01Q 1/00* (2006.01)
*H01Q 1/24* (2006.01)
(Continued)

(52) U.S. Cl.
CPC .............. *H01Q 1/243* (2013.01); *H01Q 1/248* (2013.01); *H01Q 1/38* (2013.01); *H01Q 1/40* (2013.01);
(Continued)

(58) Field of Classification Search
CPC ............ H01Q 7/06; H01Q 1/24; H01Q 1/243; H01Q 1/248; H01Q 1/38; H01Q 1/40; H01Q 7/00; H01Q 7/08
(Continued)

(56) References Cited

U.S. PATENT DOCUMENTS

2003/0179151 A1 9/2003 Senba et al.
2005/0007296 A1 1/2005 Endo et al.
(Continued)

FOREIGN PATENT DOCUMENTS

GB        2470113 A   * 11/2010   ....... G06K 19/07749
JP    2005-070855 A      3/2005
(Continued)

OTHER PUBLICATIONS

May 11, 2016 Extended Search Report issued in European Patent Application No. 13846675.0.
(Continued)

*Primary Examiner* — Dieu Hien T Duong
(74) *Attorney, Agent, or Firm* — Oliff PLC

(57) ABSTRACT

An electronic device and an antenna device are provided that use a coil module which is thinned without losing the characteristics of the coil module and which can be mounted in a narrowed space. A coil module including a loop-shaped antenna coil wounded in a planar shape and a sheet-shaped magnetic sheet which is formed of a magnetic material and which overlaps with at least a part of the antenna coil is included. In the coil module, a part of the antenna coil is overlapped with an internal structure of a housing and the magnetic sheet is provided in a position that does not overlap with the internal structure on an antenna coil surface side that overlaps with the internal structure.

18 Claims, 15 Drawing Sheets

(51) Int. Cl.
*H01Q 1/38* (2006.01)
*H01Q 1/40* (2006.01)
*H01Q 7/00* (2006.01)
*H04B 5/00* (2006.01)
*H01Q 1/52* (2006.01)
*H01Q 7/06* (2006.01)
*H04M 1/02* (2006.01)

(52) U.S. Cl.
CPC .............. *H01Q 1/52* (2013.01); *H01Q 7/00* (2013.01); *H01Q 7/06* (2013.01); *H04B 5/0031* (2013.01); *H04B 5/0093* (2013.01); *H04M 1/026* (2013.01)

(58) Field of Classification Search
USPC .................................................. 343/788, 702
See application file for complete search history.

(56) References Cited

U.S. PATENT DOCUMENTS

| | | |
|---|---|---|
| 2009/0008460 A1 | 1/2009 | Kato |
| 2009/0121030 A1 | 5/2009 | Kato et al. |
| 2010/0237152 A1 | 9/2010 | Kato |
| 2012/0098711 A1* | 4/2012 | Yosui .................. H01Q 1/2216 343/702 |
| 2012/0208606 A1* | 8/2012 | Kubo .................. G06K 19/07779 455/575.7 |
| 2012/0267438 A1 | 10/2012 | Kato et al. |
| 2013/0012127 A1 | 1/2013 | Orihara et al. |
| 2013/0181805 A1 | 7/2013 | Saito et al. |
| 2013/0214049 A1 | 8/2013 | Kato et al. |
| 2014/0218261 A1 | 8/2014 | Ito |

FOREIGN PATENT DOCUMENTS

| | | | |
|---|---|---|---|
| JP | 2006-113944 A | 4/2006 | |
| JP | 2008-035464 A | 2/2008 | |
| JP | WO 2012050037 A1 * | 4/2012 | .............. H01Q 1/38 |
| WO | 2009/005080 A1 | 1/2009 | |
| WO | 2011/125850 A1 | 10/2011 | |
| WO | 2012/091108 A1 | 7/2012 | |

OTHER PUBLICATIONS

Jan. 14, 2014 International Search Report issued in International Application No. PCT/JP2013/078086.
Mar. 21, 2018 Office Action issued in European Patent Application No. 13 846 675.0.

* cited by examiner

ELECTRONIC DEVICE AND ANTENNA DEVICE

TECHNICAL FIELD

The present invention relates to an electronic device and an antenna device which are incorporated with a coil module including a loop coil and a magnetic sheet. This application claims the priority based on Japanese Patent Application No. 2012-230266 filed on Oct. 17, 2012 in Japan and Japanese Patent Application No. 2013-021617 filed on Feb. 6, 2013 in Japan, the entire contents of which are incorporated herein by reference.

BACKGROUND ART

RF antennas such as an antenna for telephone communication, an antenna for GPS, an antenna for wireless LAN/BLUETOOTH (registered trademark), and RFID (Radio Frequency Identification) are mounted in a wireless communication device in recent years. In addition to the above antennas, a loop coil for transmitting power has also been mounted with introduction of non-contact charging. Power transmission methods employed for the non-contact charging are exemplified by an electromagnetic induction method, a radio wave reception method, a magnetic resonance method, and the like. All of these methods use electromagnetic induction and/or magnetic resonance between a primary coil and a secondary coil. For example, electromagnetic induction is used in Qi standard for non-contact charging and NFC (Near Field Communication) standard of RFID.

Even if these antennas are designed for a single antenna to obtain maximum characteristics at a target frequency, when the antenna is actually mounted in an electronic device, it is difficult to obtain target characteristics. This is because magnetic field components around the antenna are interfered with (coupled with) metal and the like located nearby and the inductance of an antenna coil is substantially reduced, and thereby a resonance frequency is shifted. Further, the receiver sensitivity is lowered by the substantial reduction of the inductance. As a countermeasure against the above, it is possible to reduce the interference due to metal by interposing a magnetic shield member formed of a magnetic material such as ferrite between the antenna coil and the metal located around the antenna coil and converging magnetic fluxes generated from the antenna coil to the magnetic shield member.

PRIOR ART DOCUMENT

Patent Document

Patent Document 1: Unexamined Japanese Patent Publication No. 2008-35464

SUMMARY OF THE INVENTION

Problems to be Solved by the Invention

With miniaturization of electronic devices such as mobile terminal devices, increase of the number of components due to high functionality, increase of battery capacity due to increase of power consumption, and the like, a space allocated for mounting the coil module as described above has been very small in an electronic device housing. Therefore, a demand for thinning of the module is grown in order to mount an antenna module for RFID and a charging module for non-contact charging in a narrowed space.

Here, as shown in FIGS. 17A and 17B, a common antenna module 60 has a configuration in which a magnetic sheet 62 for converging magnetic fluxes is adhered to a spiral-coil-shaped antenna coil 61 through an adhesive layer 63 to which an adhesive is applied. As shown in FIG. 18, when the antenna module 60 having a sheet shape is mounted in an electronic device, the sheet-shaped antenna module 60 is often arranged at a position overlapping with a main surface of a metal housing 65a of a battery 65 because of restriction of arrangement space.

Therefore, regarding the thickness of the electronic device, the thickness of the entire antenna module 60 is added to thickness of the battery 65, so that the antenna module 60 is required to be further thinned. On the other hand, when the magnetic sheet 62 is formed to be thin in order to thin the entire antenna module 60, the effect of magnetic shielding decreases and the communication characteristics are affected, so that there is a limitation of thinning.

Therefore, an object of the present invention is to provide an electronic device that uses a coil module which is thinned without losing the characteristics of the coil module and which can be mounted also in a narrowed space.

Means to Solve the Problems

In order to solve the foregoing problems, an electronic device according to the present invention includes a coil module including a loop coil wounded in a planar shape and a sheet-shaped magnetic sheet which is formed of a magnetic material and which overlaps with at least a part of the loop coil, wherein in the coil module, a part of the loop coil overlaps with an internal structure of a housing and the magnetic sheet is provided in a position that does not overlap with the internal structure on a loop coil surface side that overlaps with the internal structure.

In addition, the electronic device according to the present invention includes a coil module including a loop coil wounded in a planar shape and a sheet-shaped magnetic sheet which is formed of a magnetic material and which overlaps with at least a part of the loop coil. In the coil module, a part of the loop coil overlaps with a conductor connected to the internal structure of the housing of the electronic device and the magnetic sheet is provided in a position which does not overlap with the conductor and which is on a surface opposite to a loop coil surface that overlaps with the conductor.

In addition, an antenna device of the present invention is an antenna device which is included in an electronic device and communicates with an external device through an electromagnetic field signal. The antenna device includes a coil module which is provided on an inner surface of one member that forms a housing of the electronic device and which includes a loop coil wounded in a planar shape and a sheet-shaped magnetic sheet which is formed of a magnetic material and which overlaps with at least a part of the loop coil, and a conductor that forms a part of the one member. In the coil module, a part of the loop coil overlaps with the conductor and the magnetic sheet is provided in a position that does not overlap with the conductor on a surface opposite to a loop coil surface that overlaps with the conductor.

According to the present invention, the magnetic sheet is provided in a position that does not overlap with the internal structure or the conductor, so that in the electronic device housing, only the loop coil overlaps with the internal structure or the conductor and the magnetic sheet does not overlap with the internal structure or the conductor in the coil module. Therefore, it is possible to thin the electronic device housing by the thickness of the magnetic sheet and the adhesive layer in the thickness direction of the internal structure.

Further, in the present invention, the magnetic sheet is arranged near the main surface of the internal structure or a side edge of the conductor, so that the magnetic sheet efficiently draws in many magnetic fluxes in a strong magnetic field area and the characteristics of the coil module can be improved.

DESCRIPTION OF THE EMBODIMENTS

Hereinafter, an electronic device to which the present invention is applied will be described in detail with reference to the drawings. Note that it is a matter of course that the present invention is not limited to the embodiment described below and can be variously changed without departing from the scope of the present invention. The drawings are schematic and the ratios of dimensions may be different from the actual ratios. Specific dimensions and the like should be determined by considering the description below. In addition, it is a matter of course that the drawings include portions whose dimensions and ratios are different from those of portions of another drawing.

[Configuration of Antenna Device]

Figure 1A:
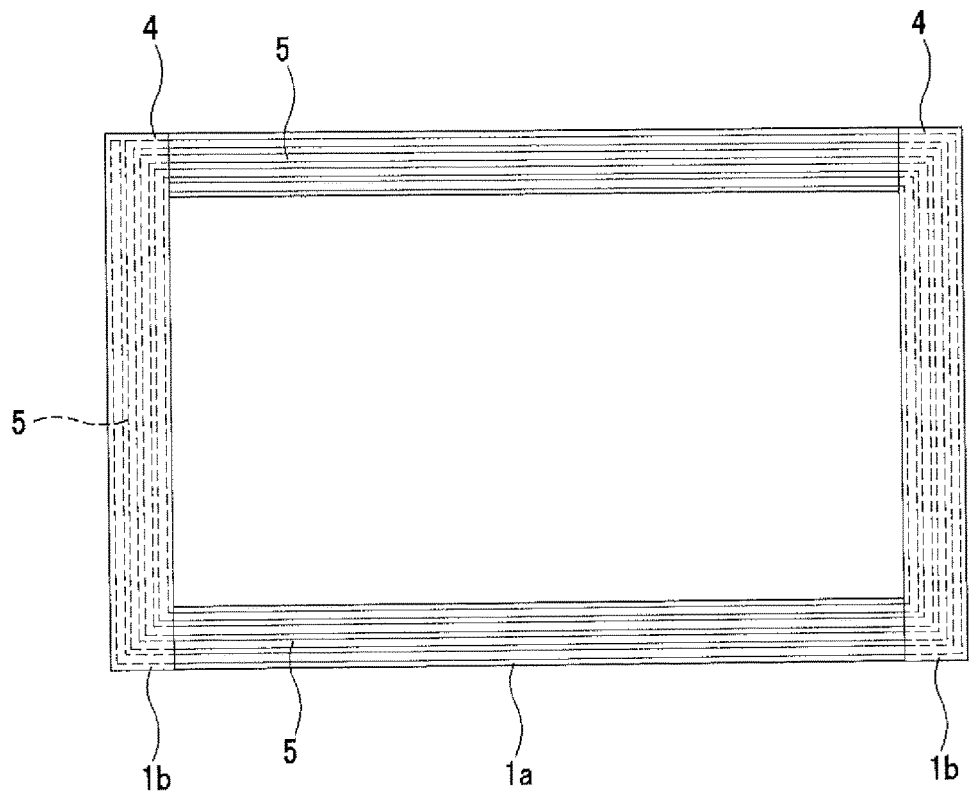
FIG. 1A is a plan view of a coil module to which the present invention is applied.
Figure 1B:
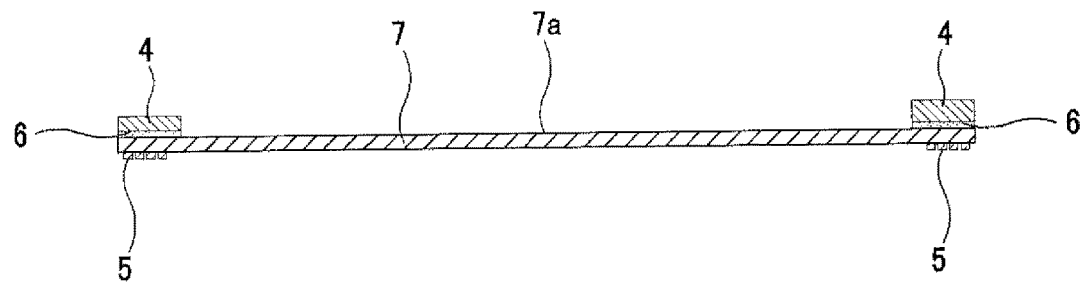
FIG. 1B is a cross-sectional view of the coil module.

A coil module 1 to which the present invention is applied is included in an electronic device such as a mobile phone and achieves a near field communication function. Specifically, as shown in FIGS. 1A and 1B, the coil module 1 to which the present invention is applied is a module for RFID such as NFC and includes a sheet-shaped magnetic sheet 4 formed of a magnetic material and a spiral-coil-shaped antenna coil 5 which is provided on the magnetic sheet 4 and wounded in a planar shape.

The magnetic sheet 4 is formed of, for example, a sintered body of NiZn-based ferrite. The magnetic sheet 4 is formed by sintering ferrite particles applied in a thin sheet shape in a high temperature environment into a sheet and thereafter demolding the sheet into a predetermined shape. Alternatively, the magnetic sheet 4 can be formed by applying ferrite particles in a sheet shape that is the same as the final shape beforehand and sintering the ferrite particles. In addition, it is possible to obtain a predetermined shape of the magnetic sheet 4 by stuffing ferrite particles into a mold having a rectangular cross section, sintering the ferrite particles into a rectangular parallelepiped having a rectangular shape in plan view, and thinly slicing the sintered body.

In addition, the magnetic sheet 4 may include magnetic particles formed of soft magnetic powder and a resin that serves as a binder.

In addition, as the magnetic particles, particles of oxide magnetic body such as ferrite, crystal-based magnetic body or microcrystal-based magnetic body of Fe-based magnetic body such as sendust and permalloy, Co-based, Ni-based, Fe—Ni-based, Fe—Co-based, Fe—Al-based, Fe—Si-based, Fe—Si—Al-based, Fe—Ni—Si—Al-based, and the like or amorphous metal magnetic body such as Fe—Si—B-based, Fe—Si—B—C-based, Co—Si—B-based, Co—Zr-based, Co—Nb-based, Co—Ta-based, and the like can be used.

Of these, as the magnetic sheet 4 used for the antenna module for RFID such as NFC, the aforementioned NiZn-based ferrite is preferably used as a magnetic material.

As the binder, a resin and the like that is cured by heat, ultraviolet irradiation, and the like can be used. As the binder, known materials such as, for example, resins such as an epoxy resin, a phenol resin, a melamine resin, a urea resin and an unsaturated polyester, or a silicone rubber, a urethane rubber, an acrylic rubber, a butyl rubber, and an ethylene-propylene rubber can be used. Regarding the binder, an appropriate amount of surface preparation agent such as flame retardant, reaction conditioning agent, crosslinking agent, or silane coupling agent may be added to the aforementioned resin or rubber.

It is noted that the magnetic sheet 4 may be not only formed of a single magnetic material, but also formed by mixing two or more types of magnetic materials, or may be formed by laminating in multilayer. In addition, even when the magnetic sheet 4 is formed of a single magnetic material, the magnetic sheet 4 may be formed by selecting and mixing particle diameters and/or shapes of magnetic particles, or may be formed by laminating the magnetic sheet 4 in a multilayer.

The antenna coil 5 is formed by forming a conductive pattern formed of Cu foil or the like on a flexible substrate 7 formed of polyimide or the like in a spiral coil.

The magnetic sheet 4 is overlapped on one surface 7a of the flexible substrate 7 through an adhesive layer 6. As the adhesive layer 6, a known material such as an adhesive agent and an adhesive tape can be used. In addition, the magnetic sheet 4 is overlapped with at least a part of the antenna coil 5. Thereby, the coil module 1 efficiently draws magnetic fluxes into the antenna coil 5, is magnetically coupled with a reader/writer by inductive coupling, and receives modulated electromagnetic waves. A received signal is supplied to a memory through a terminal portion connected to the antenna coil 5.

[Configuration of Present Invention]

Figure 2A:
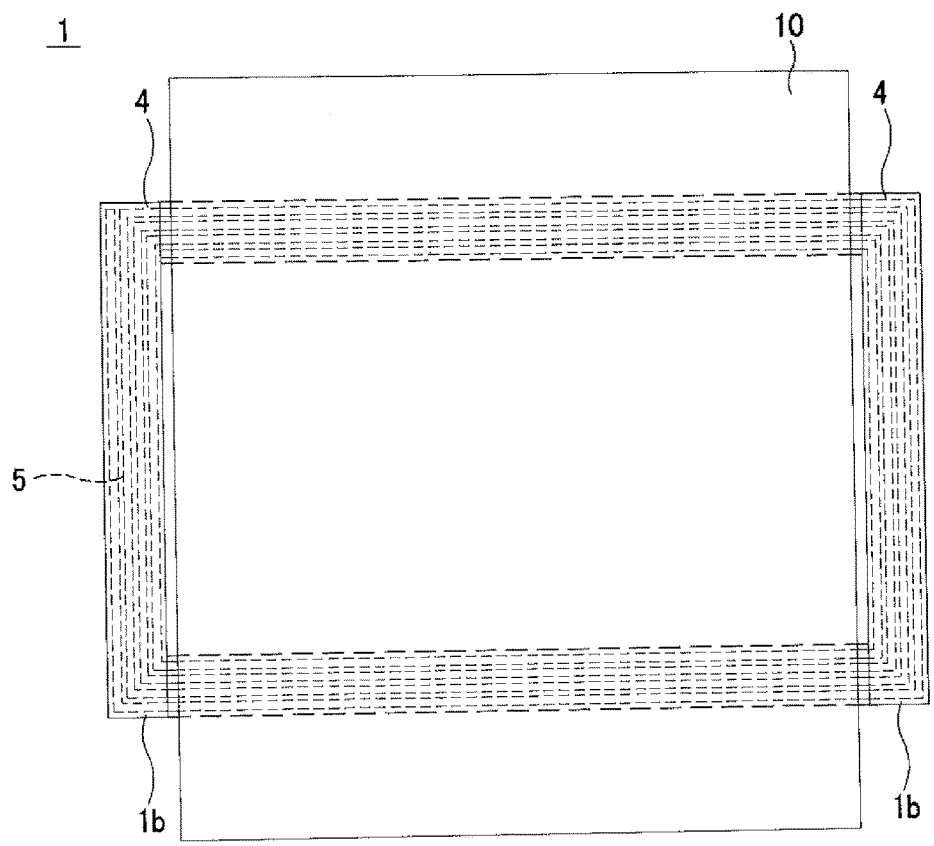
FIG. 2A is a plan view showing an arrangement of the coil module inside an electronic device housing according to the present invention.
Figure 2B:
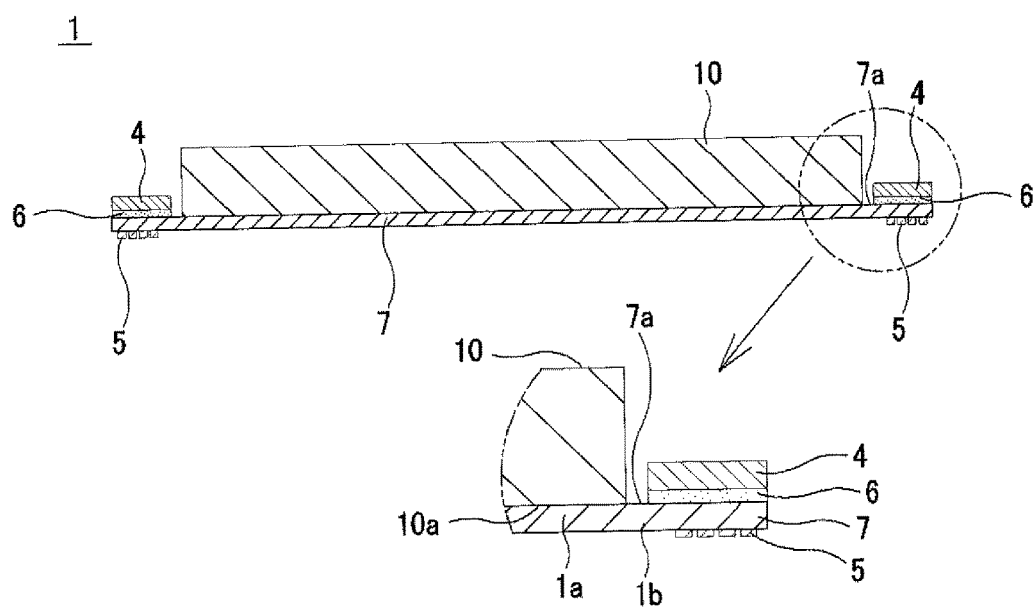
FIG. 2B is a cross-sectional view showing the arrangement.

Here, as shown in FIGS. 2A and 2B, the coil module 1 includes an overlap portion 1a where a part of the antenna coil 5 overlaps with an internal structure 10 of the electronic device housing and an extension portion 1b that extends outward from a main surface 10a of the internal structure 10. In the coil module 1, the magnetic sheet 4 is provided in a position that does not overlap with the internal structure 10 on an antenna coil 5 surface side that overlaps with the internal structure 10, that is, the magnetic sheet 4 is provided on the extension portion 1b.

Here, the internal structure 10 has the main surface 10a facing a reader/writer that performs communication, and the sheet-shaped coil module 1 is arranged to overlap with the main surface 10a. In other words, the coil module 1 is arranged so that a part of the flexible substrate 7 where the antenna coil 5 is formed overlaps with the internal structure 10 such as a battery can provided in the electronic device housing and the flexible substrate 7 extends outward from an outer edge of the structure 10.

Thereby, in the coil module 1, a part of the antenna coil 5 overlaps with the internal structure 10 and the other part of the antenna coil 5 does not overlap with the internal structure 10. The magnetic sheet 4 is overlapped in a position where the antenna coil 5 does not overlap with the internal structure 10 on an antenna coil 5 surface side that overlaps with the internal structure 10.

Therefore, in the coil module 1, the magnetic sheet 4 provided on the extension portion 1b does not overlap with the internal structure 10 such as a battery can. Thereby, in the coil module 1 in the electronic device housing, only the flexible substrate 7 where the antenna coil 5 is formed overlaps with the internal structure 10 and the magnetic sheet 4 does not overlap with the internal structure 10. Therefore, it is possible to thin the electronic device housing by the thickness of the magnetic sheet 4 and the adhesive layer in the thickness direction of the internal structure 10.

For example, it is preferable to secure a thickness of about 0.3 to 0.4 mm for the magnetic sheet 4 so as to obtain a magnetic shielding effect. The housing thickness of mobile phone is about 7 mm, so that it can be said that the effect of thinning by the sum of the thicknesses of the magnetic sheet 4 and the adhesive layer is large.

Further, in the coil module 1, the magnetic sheet 4 is arranged to overlap with the antenna coil 5 on the extension portion 1b that does not overlap with the internal structure 10, so that it is possible to efficiently draw in the magnetic field and the communication characteristics are not damaged. In particular, the magnetic fluxes flowing toward the main surface 10a of the internal structure 10 flows to both side edges by the main surface 10a, so that the magnetic field strength at both side edges of the main surface 10a is high. In the coil module 1, the magnetic sheet 4 is arranged near the side edge of the main surface 10a of the internal structure 10, so that the coil module 1 efficiently draws in many magnetic fluxes in a strong magnetic field area and the communication characteristics of the coil module 1 can be improved.

In particular, when the internal structure 10 is a metal body such as a battery can, the magnetic field components around the coil module 1 are possibly interfered with (coupled with) the metal body and the inductance of the antenna coil 5 substantially reduces, and thereby the resonance frequency is shifted, and the receiving sensitivity is also possibly lowered by the substantial reduction of the inductance. However, in the coil module 1, it is possible to reduce the interference with the metal body by converging the magnetic fluxes to the magnetic sheet 4 by interposing the magnetic sheet 4 on at least a part of the antenna coil 5.

[Other Configuration 1]

As shown in FIGS. 1A and 1B, the coil module 1 may be configured so that the extension portion 1b that does not overlap with the internal structure 10 is provided on both sides of the main surface 10a of the internal structure 10, one side and the other side of the antenna coil 5, which sandwich the center of the antenna coil 5, are formed on the extension portions 1b provided on both sides of the main surface 10a of the internal structure 10, and the magnetic sheet 4 is overlapped with the one side and the other side of the antenna coil 5.

Also in this case, in the coil module 1, the magnetic sheet 4 is provided on the extension portion 1b, so that it is possible to thin the electronic device housing including the internal structure 10 without attaching the magnetic sheet 4 to a position that overlaps with the internal structure 10. Further, the coil module 1 can draw in the magnetic fluxes flowing on the main surface 10a of the internal structure 10 toward both side edges by each magnetic sheet 4 provided on one side and the other side of the center of the antenna coil 5 and efficiently generate currents in the same direction on the one side and the other side of the antenna coil 5, so that the coil module 1 can perform efficient communication by preventing currents from occurring in directions opposite to each other.

Figure 3:
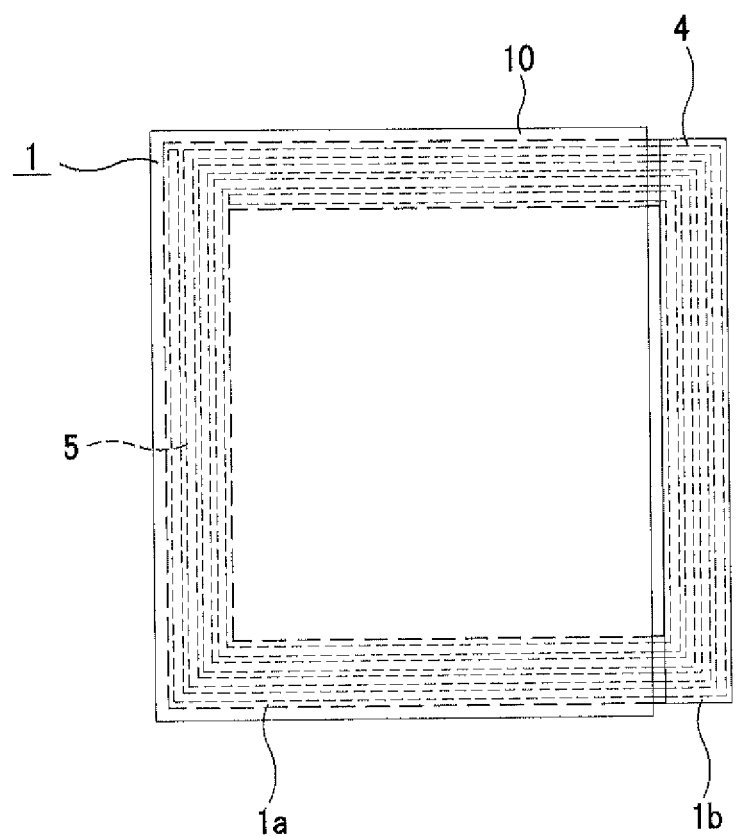
FIG. 3 is a plan view showing another example of the coil module to which the present invention is applied.
Figure 4:
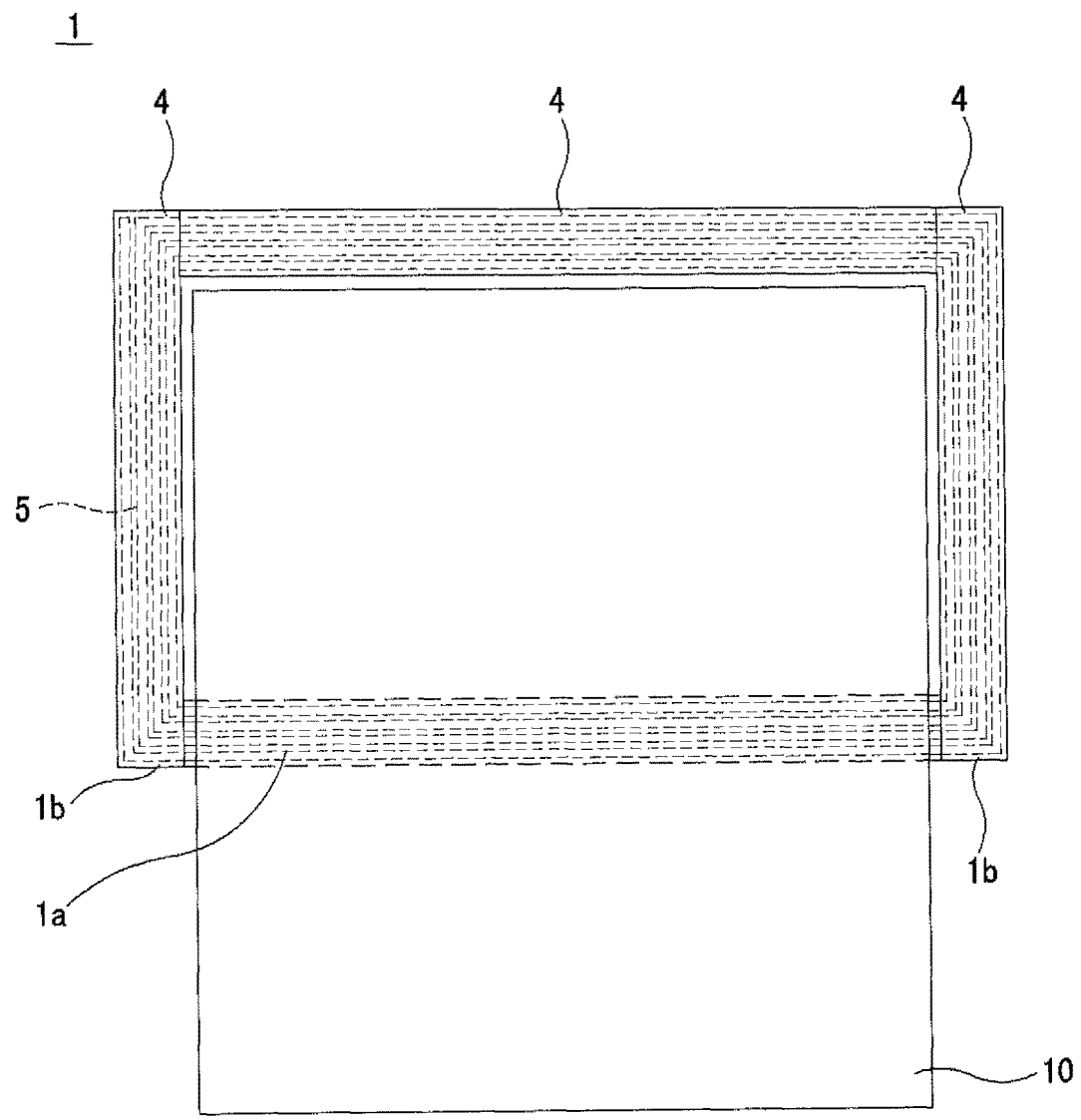
FIG. 4 is a plan view showing another example of the coil module to which the present invention is applied.

It is noted that, as shown in FIG. 3, the coil module 1 may be configured so that an overlap portion overlapping with the internal structure 10 is formed to one side edge of the main surface 10a, the extension portion 1b is provided on the other side of the main surface 10a of the internal structure 10, the other side extending from the center of the antenna coil 5 is formed on the extension portion 1b, and the magnetic sheet 4 overlaps with the one side of the antenna coil 5. Further, as shown in FIG. 4, the coil module 1 may be configured so that the extension portion 1b is provided along the three sides of the main surface 10a of the internal structure 10, one of the three sides of the antenna coil 5 surrounding the center of the antenna coil 5 is formed on the extension portion 1b of each side, and the magnetic sheet 4 is overlapped with the extension portion 1b of each side.

Also in these cases, it is possible to thin the electronic device housing including the internal structure 10 and it is possible to draw in the magnetic fluxes flowing toward the outer edges of the main surface 10a by the magnetic sheet 4 and maintain the communication characteristics.

[Other Configuration 2]

Figure 5A:
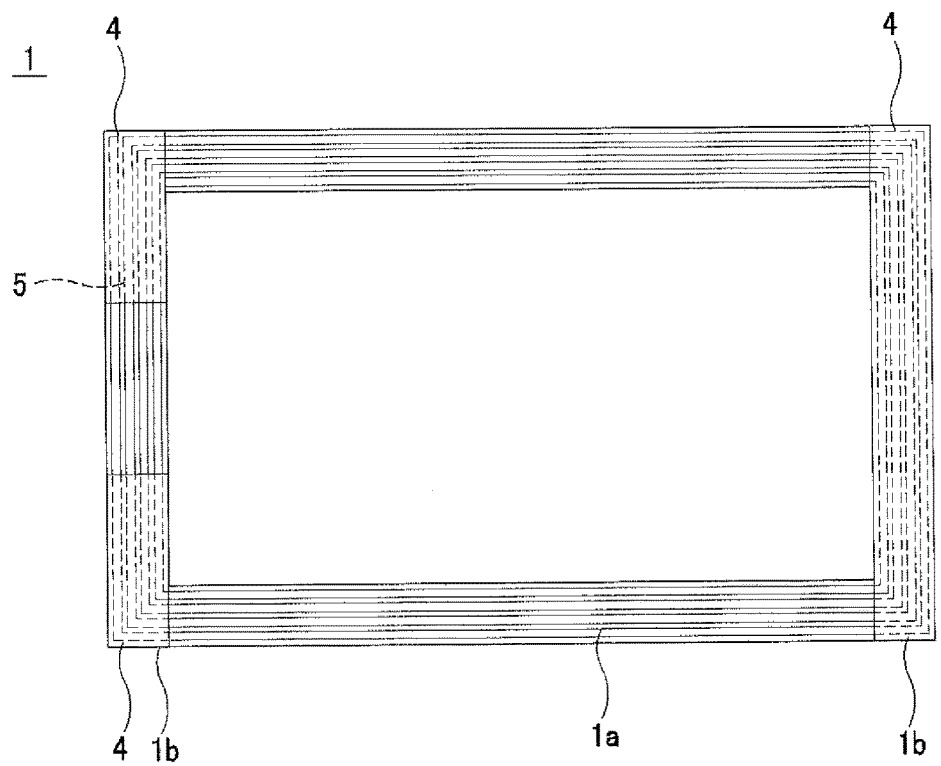
FIGS. 5A and 5B are plan views showing another example of the coil module to which the present invention is applied.
Figure 5B:
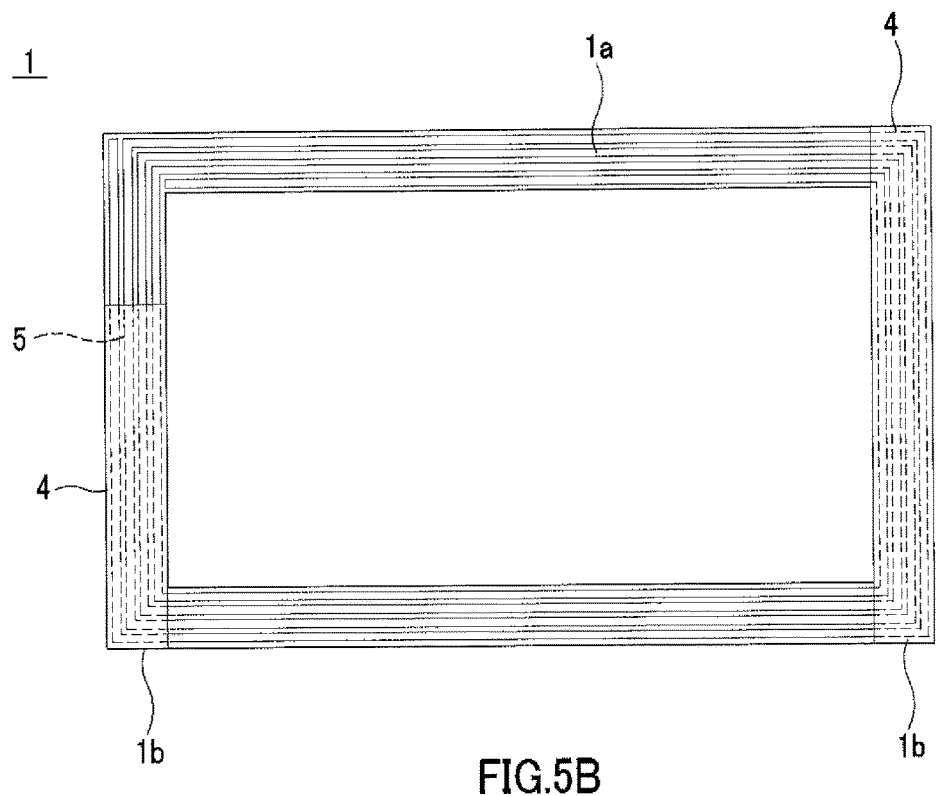
Figure 6:
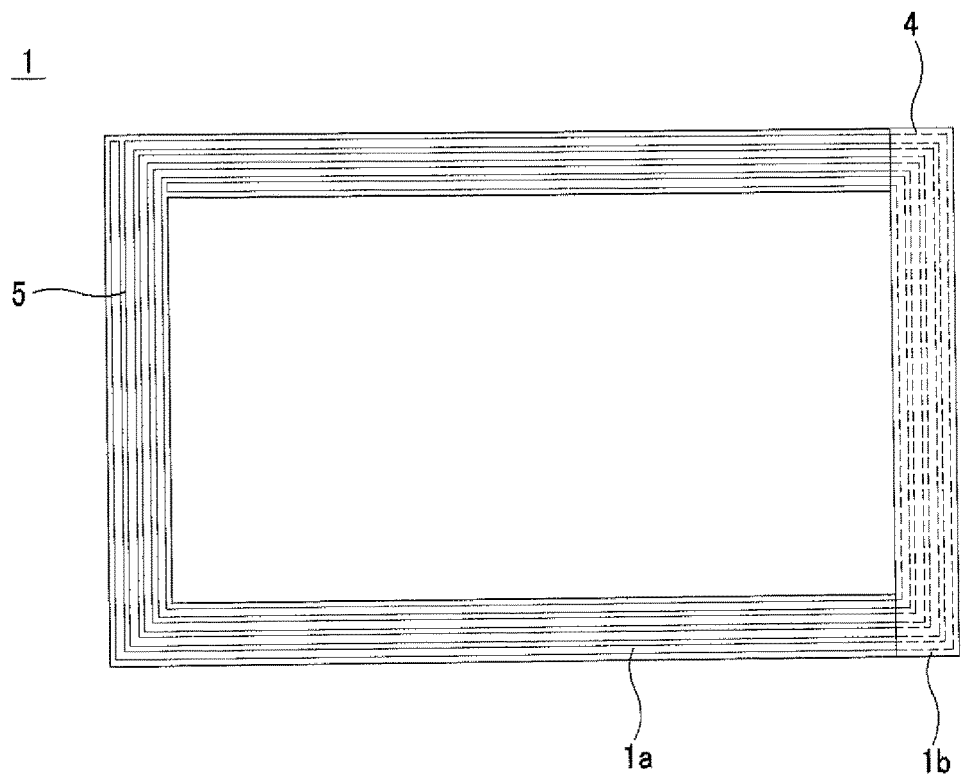
FIG. 6 is a plan view showing another example of the coil module to which the present invention is applied.

As shown in FIGS. 5A and 5B, the coil module 1 may be configured so that when the magnetic sheet 4 is overlapped with the one side and/or the other side of the antenna coil 5 formed on the extension portion 1b, the magnetic sheet 4 is overlapped with a part of the one side and/or the other side of the antenna coil 5. In addition, as shown in FIG. 6, the coil module 1 may be configured so that the magnetic sheet 4 is overlapped with only one side or the other side of the antenna coil 5 formed on the extension portion 1b. Thereby, when other components such as switches and buttons are arranged on the extension portion 1b, the magnetic sheet 4 can be arranged without interfering with the other components. Also in this case, it is possible to efficiently draw in the magnetic field, and improve and maintain the communication characteristics by providing the magnetic sheet 4 on the extension portion 1b.

[Other Configuration 3]

Figure 7:
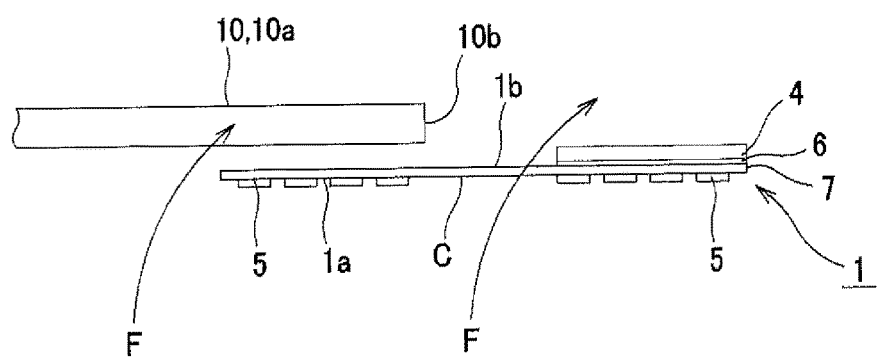
FIG. 7 is a cross-sectional view showing another arrangement of the coil module inside the electronic device housing according to the present invention and is a diagram for explaining that a magnetic field converges according to an arrangement of an internal structure and a magnetic sheet.
Figure 7:
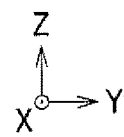

In addition, as shown in FIG. 7, the coil module 1 may be configured so that the center C of the antenna coil 5 is positioned at an outer edge of the main surface 10a of the internal structure 10. In other words, as seen from the center C, one side of the antenna coil 5 is formed on the overlap portion 1a and the other side of the antenna coil 5 is formed on the extension portion 1b, and further the magnetic sheet 4 is adhered to the other side of the antenna coil 5.

Thereby, the coil module 1 can alleviate a problem that magnetic fluxes F from the reader/writer which pass through the antenna coil 5 generate currents in directions opposite to each other on one side of a loop coil in which a coil conductor moves around in one direction and on the other side of the loop coil in which the coil conductor moves around in the other direction and the coil module 1 cannot be efficiently coupled.

In other words, as shown in FIG. 7, in the coil module 1, the magnetic sheet 4 is not provided on the overlap portion 1a that overlaps with the main surface 10a of the internal structure 10, so that the magnetic field components around the overlap portion 1a are interfered with a metal that forms the main surface 10a and the receiver sensitivity is lowered. On the other hand, the coil module 1 efficiently draws in the magnetic fluxes by providing the magnetic sheet 4 on the extension portion 1b that does not overlap with the main surface 10a of the internal structure 10. Thereby, it is possible to relatively reduce the amount of current in a direction opposite to the direction of the current generated in the extension portion 1b by preventing the coupling in the overlap portion 1a, induce the magnetic fluxes from the overlap portion 1a to the extension portion 1b, expedite the coupling in the extension portion 1b, and improve the communication characteristics.

In addition, although the magnetic field from the reader/writer is interfered with the metal that forms the main surface 10a of the internal structure 10, the magnetic field flows toward the end portion of the internal structure along the internal structure 10, that is, along the Y axis direction in FIG. 7. The magnetic fluxes converge around the end portion 10b of the internal structure (in a dashed line circle D in FIG. 7), so that the strength of the magnetic field increases and the strengthened magnetic field is guided to the magnetic sheet 4 provided on the extension portion 1b. Therefore, the sensitivity of the antenna increases and the communication characteristics are improved.

[Other Configuration 4]

As described above, the sensitivity of the antenna can be improved according to the position of the end portion 10b of the internal structure 10 with conductivity. On the other hand, the space inside the electronic device is small, so that, in general, the arrangement flexibility of internal structures such as components and modules is low. Therefore, it is often difficult to set the position of the end portion 10b of the internal structure 10 and the position of the magnetic sheet 4 to the positions described above. A method will be described in which even when the arrangement flexibility of components and the like is low in the manner as described above, an antenna that achieves high communication performance is mounted in a limited space.

Figure 8A:
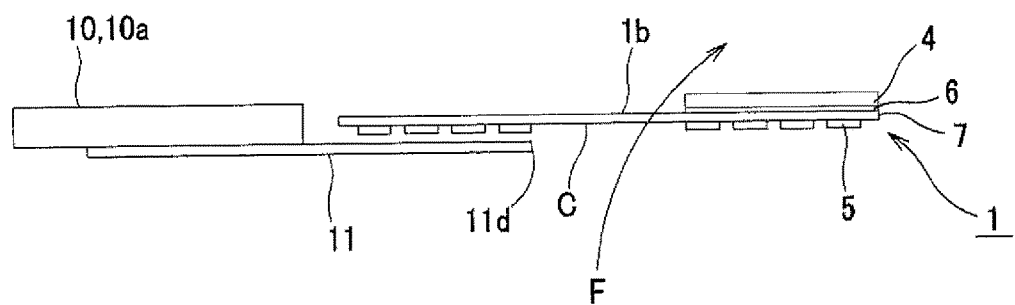
FIGS. 8A and 8B are cross-sectional views showing another arrangement of the coil module inside the electronic device housing according to the present invention and are diagrams for explaining that a magnetic field converges according to an arrangement of an internal structure, a metallic foil, and a magnetic sheet.

As shown in FIG. 8A, there is the internal structure 10 such as a battery pack inside the electronic device. Here, when the coil module 1 that forms the antenna cannot be arranged close to the internal structure 10 due to the limitation of arrangement due to other components and the like, a metallic foil 11 formed of a conductor such as Cu with high conductivity is arranged so as to cover a part of the coil module 1. In this case, it is preferable that the end portion 11d of the metallic foil 11 is arranged near the center C of the coil module 1, and the other end portion of the metallic foil 11 is arranged close to or near the internal structure 10. Although it is preferable that the internal structure 10 is formed of metal, such as a metal can of a battery pack, the metallic foil 11 and the internal structure 10 are not necessarily required to be electrically connected. The metallic foil 11 is arranged in this way and the magnetic sheet 4 is arranged on the surface opposite to the surface with which the metallic foil 11 overlaps, so that the magnetic fluxes of radio waves emitted from the reader/writer converges around the end portion 11d of the metallic foil 11. The magnetic field F is guided to the magnetic sheet 4 provided on the extension portion, so that the sensitivity of the antenna increases and the communication characteristics are improved.

Figure 8B:
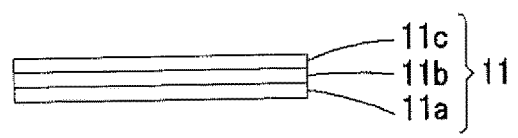

As shown in FIG. 8B, the metallic foil 11 may include an adhesive layer 11a formed by applying an adhesive to one surface of a high conductivity metal 11b such as Cu and an insulating layer 11c formed of a resin or the like formed on the other surface. The adhesive layer 11a is connected to the flexible substrate 7 and the internal structure 10 so as to come into contact with the flexible substrate 7 and the internal structure 10. The metallic foil 11 is insulated from metal portions of other components by the insulating layer 11c.

It is possible to optimize the position of the coil module 1 and the position of the metallic foil 11 by applying the metallic foil 11 so as to cover a part of the coil module 1 that forms the antenna arranged in the electronic device, so that it is possible to optimize the performance of the antenna and improve communication performance regardless of inner structure of the electronic device.

Further, it is possible to adjust the receiver sensitivity of the antenna to an optimal state by adding the metallic foil 11 near or around the antenna in a later stage by preparing a tape formed of the metallic foil 11, both surfaces of which are processed in this way.

[Other Configuration 5]

Figure 9:
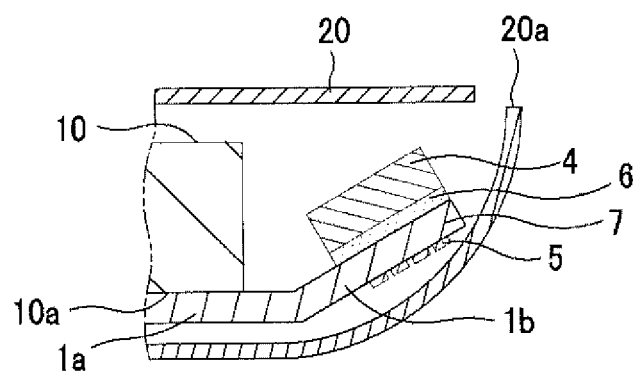
FIG. 9 is a cross-sectional view showing another arrangement of the coil module inside the electronic device housing according to the present invention.

As shown in FIG. 9, in the coil module 1, the extension portion 1b that does not overlap with the internal structure 10 may be bent according to the shapes of the side wall 20a of the housing 20 of the electronic device and other components. For example, when the side wall 20a of the housing 20 is curved, it is possible to house the coil module 1 in the space-saving housing 20 by bending the extension portion 1b according to the side wall. It is noted that the extension portion 1b may be bent in an arc shape (in a curved surface shape) along the curved surface of the housing 20a.

[Other Configuration 6]

Figure 10:
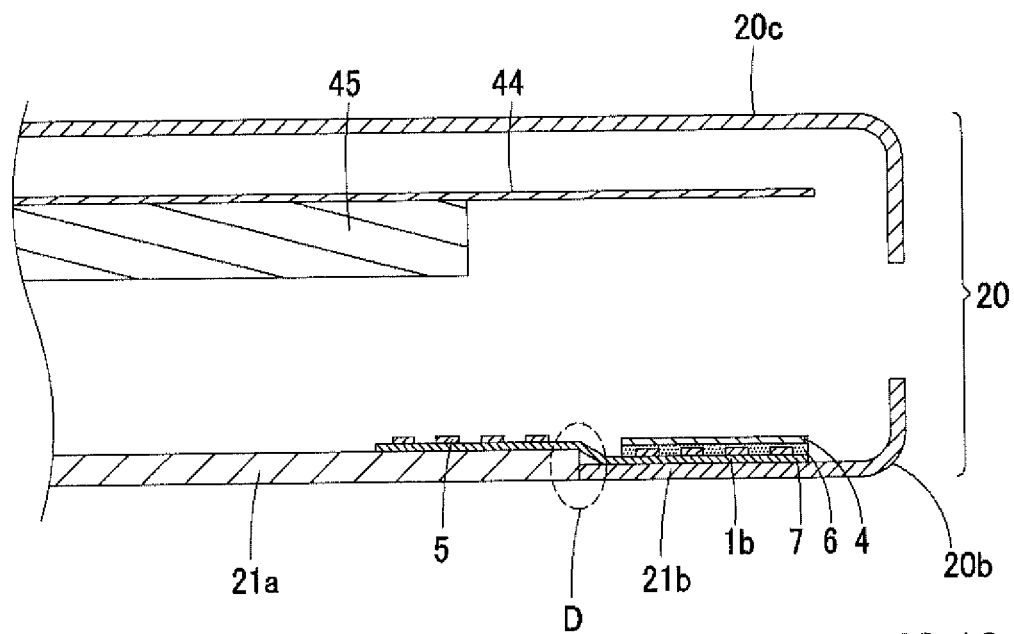
FIG. 10 is a diagram showing a configuration example in which when a part of one housing member of a housing that is divided into two housing members is formed of metal, a part of the coil module is arranged to cover the metal portion.

As shown in FIG. 10, the housing 20 of the electronic device such as a smartphone includes one housing member 20b in which the coil module 1 is mounted on its inner surface and the other housing member 20c in which a battery can 45 of a battery pack and a main body control circuit including a CPU and the like are mounted on a control substrate 44. The housing 20 is formed by coupling the one hosing member 20b to the housing member 20c including the battery can 45 and the like so that the housing member 20c is covered by the one housing member 20b. The housing members 20b and 20c are detachably coupled to each other by a known method such as screwing and a combination of an engaging claw and an engaging hole. In addition to the coil module 1, other functional modules such as a camera module may be mounted on the housing member 20b alone or in combination thereof beforehand. The housing member 20b on which the functional modules such as the coil module 1 are mounted may be removed from the housing member 20c by a user of the electronic device such as a smartphone and a housing member on which other functional modules are mounted may be adhered to the housing member 20c.

The housing member 20b is increasingly formed by a composite material in which metallic materials such as a magnesium alloy and resin materials are compositely combined in order to supplement the shortage of strength due to thinning of the housing and/or a design purpose for representing a beautiful appearance of the electronic device per se. Specifically, the housing member 20b includes a metal cover 21a formed of a metallic material and a resin portion 21b formed of a resin.

The coil module 1 is mounted in advance on the housing member 20b used as a lid and the coil module 1 is arranged so that a surface including the antenna coil 5 faces the reader/writer through the housing member 20b. The coil module 1 is preferably arranged near an external wall of the housing member 20b. As shown in FIG. 10, a part of the antenna coil 5 is arranged so as to cover the metal cover 21a that forms the hosing member 20b. It is preferable that the antenna coil 5 is arranged so that an end portion of the metal cover 21a is close to the center C of the antenna coil 5.

By arranging the coil module 1 as described above, the strength of the magnetic field near the center C of the antenna coil 5 (in the circle D in FIG. 10) increases and the magnetic field is guided to the magnetic sheet 4 on the coil module 1. Thereby, the communication characteristics can be stabilized.

Figure 11A:
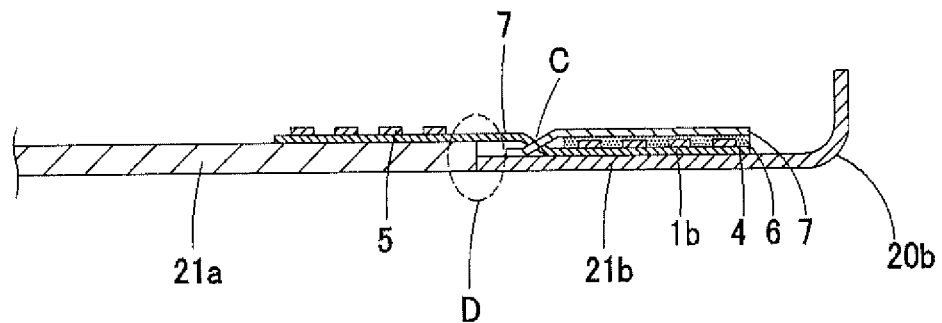
FIGS. 11A and 11B are diagrams showing a variation of the arrangement of the magnetic sheet.
Figure 11B:
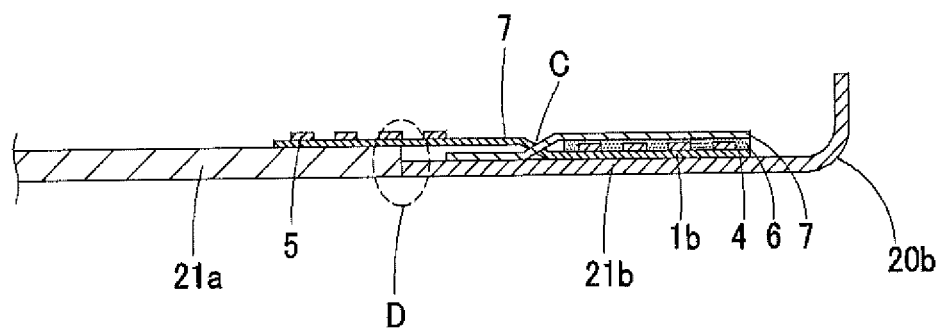

As shown in FIG. 11A, to more stabilize the communication characteristics, the magnetic sheet 4 may be extended to the metal portion 21a through the center C of the antenna coil 5. As shown in FIG. 11B, by extending the magnetic sheet 4 to the metal portion 21a through the center C of the antenna coil 5, more stabilized communication characteristics can be obtained. It is noted that even when the antenna coil 5 is located on the other housing side as shown in FIGS. 8A and 8B, it is possible to achieve more stabilized communication characteristics by extending the position of the magnetic sheet 4. It goes without saying that the extension portion 1b may be bent according to the shape of the side wall of the housing as shown in FIG. 9 or may be processed into a curved surface shape. Further, to improve the strength of the base material and the appearance, the metal cover may be configured by forming the entire base material of the housing member 20b with a resin or the like and by coating the inner surface or the outer surface of the housing member 20b with a metal. Also in such a case, in the same manner, a part of the antenna coil 5 is arranged so as to cover a part of the metal cover 21a.

[Near Field Communication System]

Figure 12:
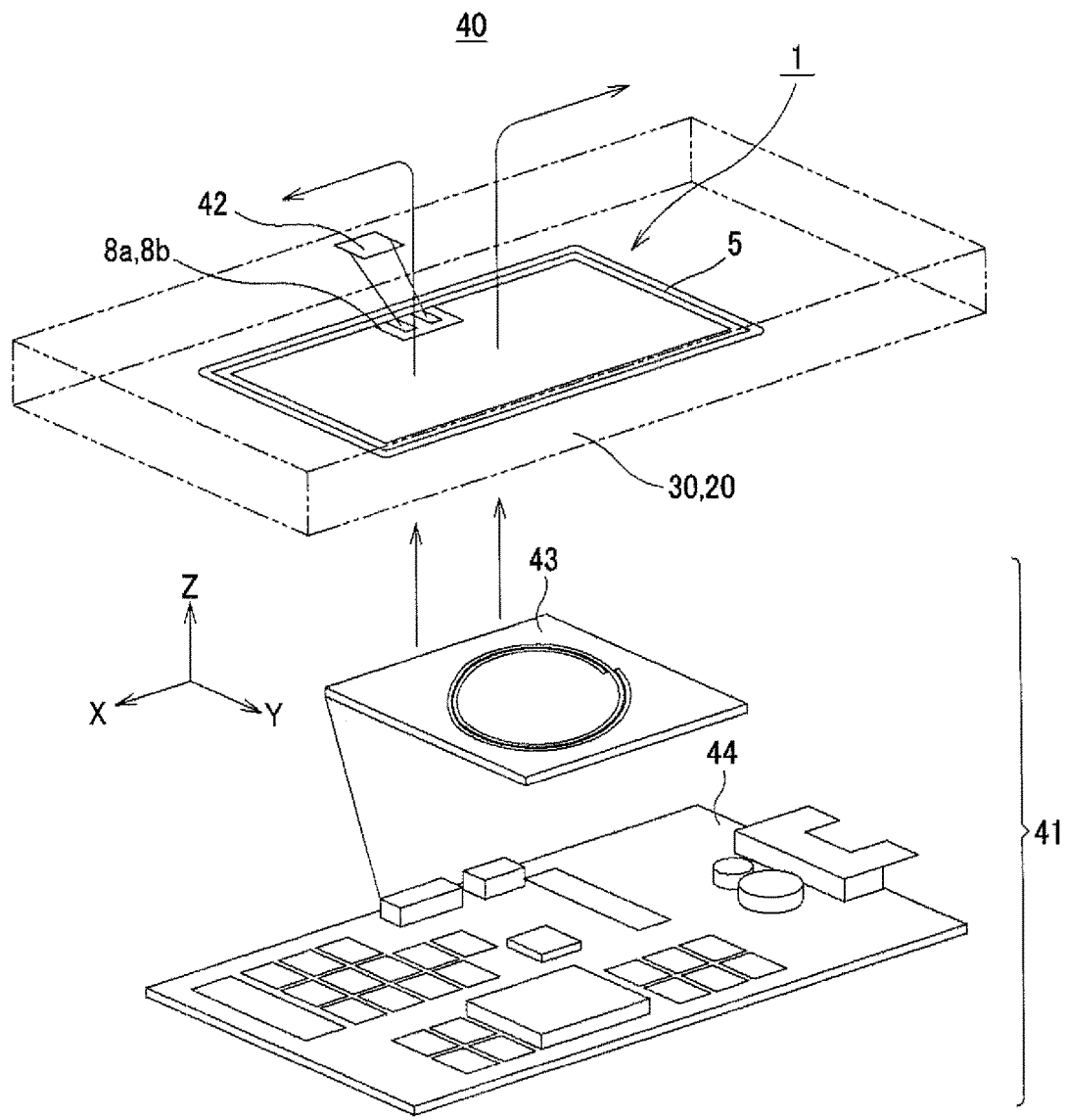
FIG. 12 is a perspective view showing a schematic configuration of a wireless communication system.

Next, the near field communication function of the coil module 1 will be described. For example, as shown in FIG. 12, the coil module 1 is included in the housing 20 of the mobile phone 30, and the coil module 1 is used as the wireless communication system 40 for RFID.

The wireless communication system 40 is a system in which the reader/writer 41 accesses the memory module 42 included in the mobile phone 30 along with the coil module 1. Here, it is assumed that the coil module 1 and the reader/writer 41 are arranged to face each other in an xy plane in a three-dimensional rectangular coordinate system xyz.

The reader/writer 41 functions as a transmitter that transmits a magnetic field in the z axis direction to the antenna coil 5 of the coil module 1 facing the reader/writer 41 in the xy plane. Specifically, the reader/writer 41 includes the antenna 43 that transmits a magnetic field to the antenna coil 5 and the control substrate 44 that communicates with the memory module 42.

In other words, the reader/writer 41 is provided with the control substrate 44 electrically connected to the antenna 43. On the control substrate 44, a control circuit including electronic components such as one or more integrated circuit chips. The control circuit performs various processing based on data received from the memory module 42 through the antenna coil 5. For example, when the control circuit transmits data to the memory module 42, the control circuit encodes the data, modulates a carrier wave of a predetermined frequency (for example, 13.56 MHz) based on the encoded data, amplifies the modulated modulation signal, and drives the antenna 43 by the amplified modulation signal. In addition, when the control circuit reads data out from the memory module 42, the control circuit amplifies a modulation signal of the data received by the antenna 43, demodulates the amplified modulation signal of the data, and decodes the demodulated data. It is noted that in the control circuit, an encoding method and a modulation method used by a general reader/writer are used. For example, Manchester coding and ASK (Amplitude Shift Keying) modulation method are used.

In the coil module 1, the antenna coil 5 receives a magnetic field transmitted from the reader/writer 41, inductively couples with the reader/writer 41, and supplies a signal to the memory module 42 that is a storage medium included in the mobile phone 30.

When the antenna coil 5 receives a magnetic field transmitted from the reader/writer 41, the antenna coil 5 is magnetically coupled with the reader/writer 41 by inductive coupling and the antenna coil 5 receives a modulated electromagnetic wave and supplies the received signal to the memory module 42 through the terminal portions 8a and 8b.

The memory module 42 is driven by a current flowing through the antenna coil 5 and communicates with the reader/writer 41. Specifically, the memory module 42 demodulates a received modulation signal, decodes the demodulated data, and writes the decoded data to an internal memory included in the memory module 42. Further, the memory module 42 reads out data to be transmitted to the reader/writer 41 from the internal memory, encodes the read data, modulates a carrier wave based on the encoded data, and transmits the modulated radio wave to the reader/writer 41 through the antenna coil 5 magnetically coupled with the reader/writer 41 by inductive coupling.

While a case has been described in which the coil module 1 according to the present invention is applied to an antenna module for RFID, the present invention may be applied to, for example, a module for non-contact charging such as Qi and other antenna modules in addition to the antenna module for RFID.

Example

Next, the coil module 1 to which the present invention is applied will be described by comparing with a conventional coil module. For both the example and a comparative example, as shown in FIGS. 13 and 14, a variation of a coupling coefficient k when the coil module is arranged to face the reader/writer and the reader/writer is gradually moved in the Y axis direction indicated by an arrow in FIGS. 13 and 14 is obtained by simulation.

Comparative Example

Figure 13:
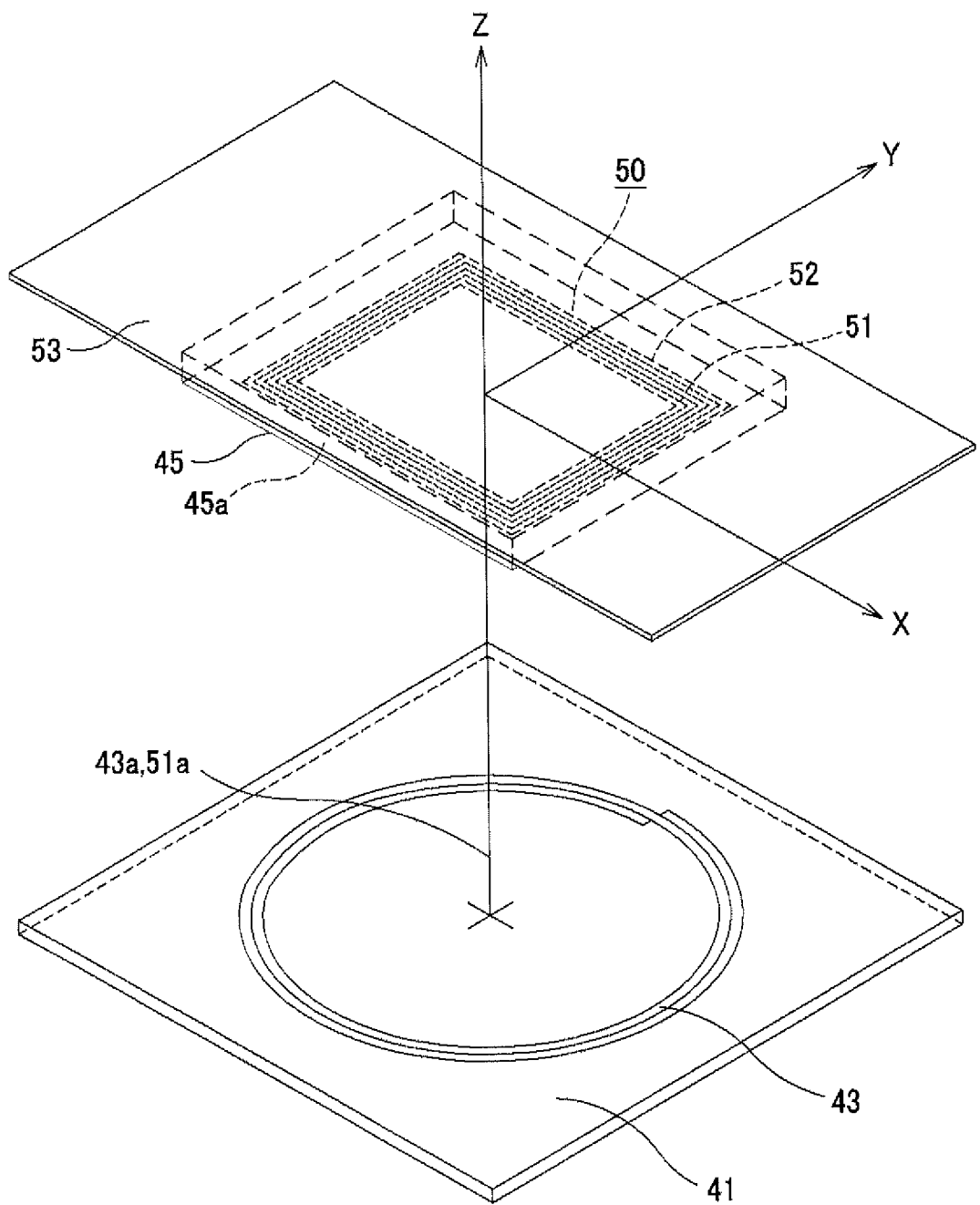
FIG. 13 is a perspective view showing a configuration of a comparative example.
Figure 14:
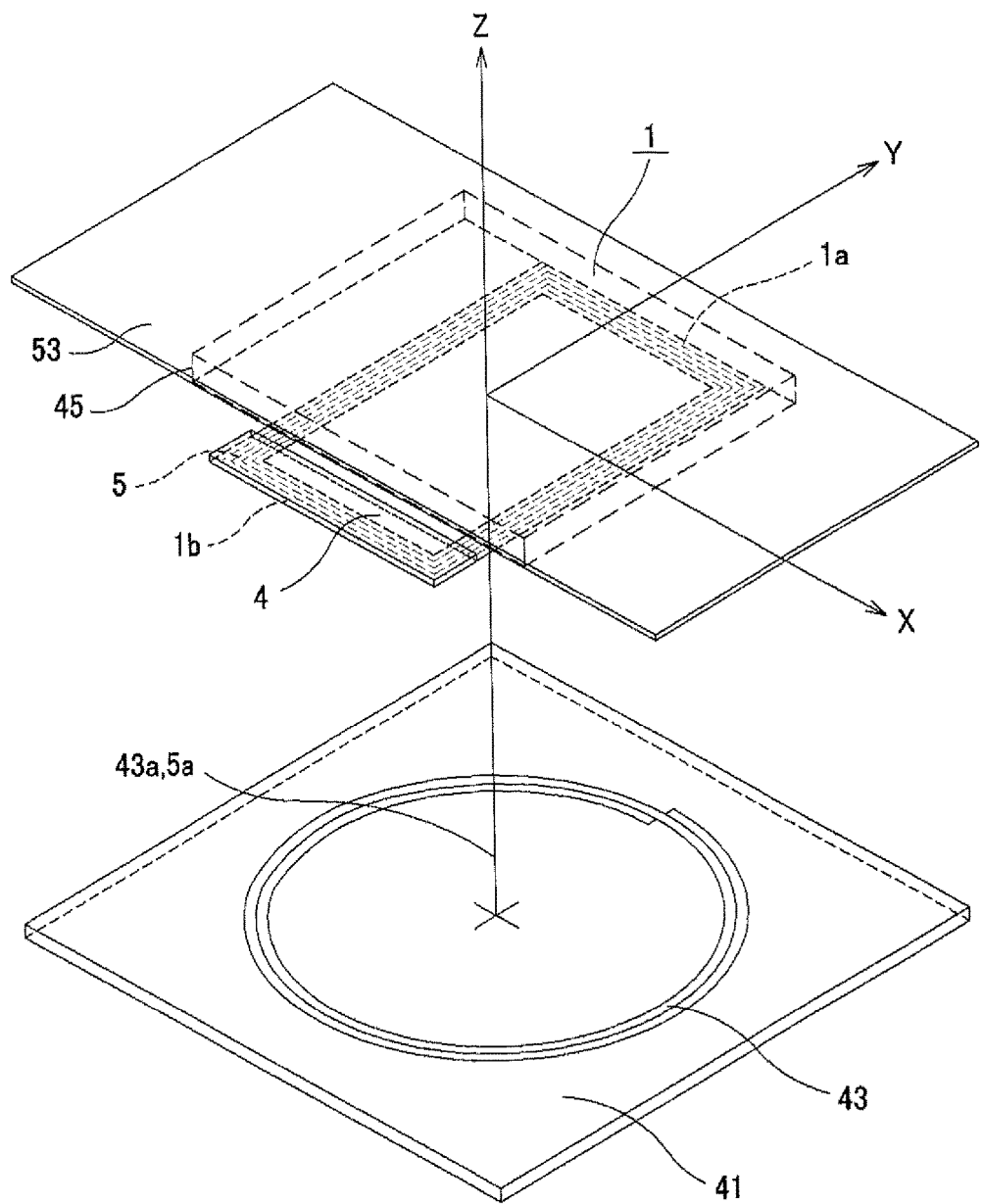
FIG. 14 is a perspective view showing a configuration of an example.

In the antenna device according to the comparative example, as shown in FIG. 13, communication characteristics were evaluated when the entire coil module 50 was overlapped with the main surface 45a of the battery can 45 made of metal and a relative positional relationship between the reader/writer 41 and the coil module 50 was changed while causing the reader/writer 41 and the coil module 50 to face each other.

Specific evaluation conditions were as follows: The antenna 43 of the reader/writer 41 was a 1.5-mm-pitch two-winding coil having an external dimension of 70 mm×70 mm, which was defined in the XY axis direction. In addition, the battery can 45 is an aluminum block having an external dimension of 60 mm×50 mm×5 mm, which was defined in the XYZ axis direction. The antenna coil 51 of the coil module 50 was a 1 mm pitch four-winding coil having an external dimension of 50 mm×40 mm, which was defined in the XY axis direction. The magnetic sheet 52 of the coil module 50 was a ferrite sheet having a thickness of 0.2 mm and an impermeability of 120, which was coated by a protective film, and was adhered to the entire surface of the antenna coil 51 through an adhesive layer.

The distance between the main surface 45a of the battery can 45 and the antenna coil 51 was 0.5 mm. Further, the distance from the antenna 43 of the reader/writer 41 to the antenna coil 51 defined in the Z axis direction is 40 mm. Then, the battery can 45 and the coil module 50 were overlapped in this order on a reinforcement plate 53 made of stainless steel, which was regarded as the electronic device housing.

Here, as a value that represents a relative positional relationship between the reader/writer 41 and the antenna coil 51, "a" described below was used. When an axis line 43a in the Z axis direction passing through the center of the antenna 43 of the reader/writer 41 and an axis line 51a in the Z axis direction passing through the center of the antenna coil 51 were assumed, the "a" was a distance between the two axes lines 43a and 51a when the reader/writer 41 was moved in the Y axis direction indicated by an arrow in FIG. 13 from a position where the two axes lines 43a and 51a coincide with each other.

Figure 15:
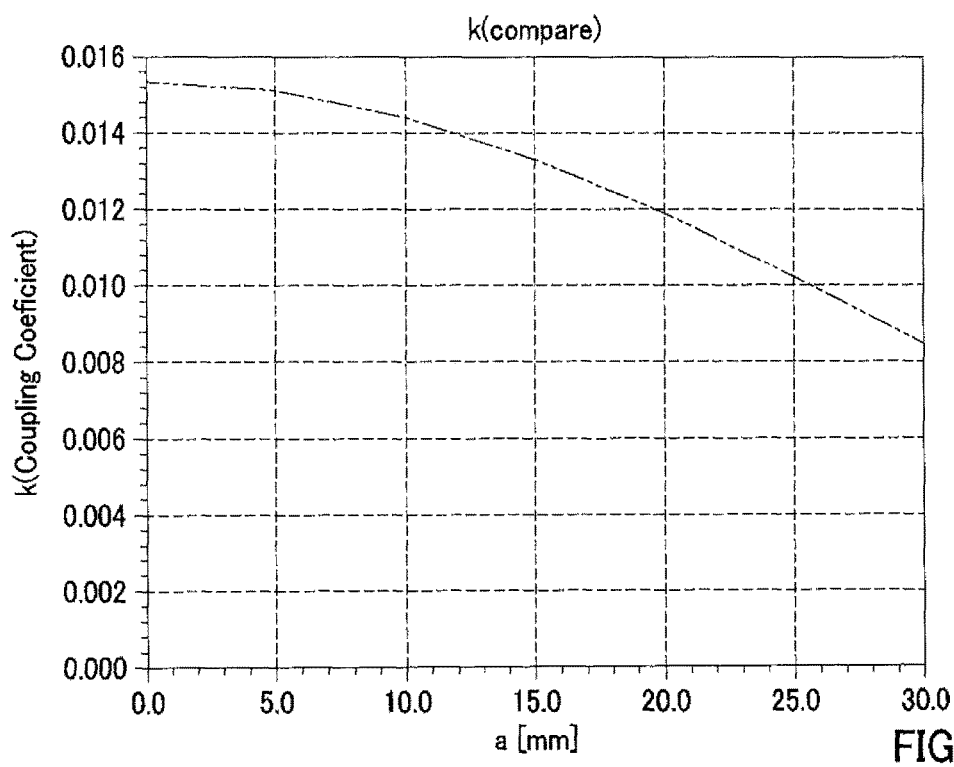
FIG. 15 is a graph showing a correlation between a coupling coefficient and a moving distance of a reader/writer of the comparative example.

Under the condition as described above, the coupling coefficient of the antenna coil 51 when the value of "a" was varied from 0 mm to 30 mm was obtained by simulation. The variation of the coupling coefficient is shown in FIG. 15.

Example

In the present example, as shown in FIG. 14, the coil module 1 including the overlap portion 1a that overlaps with the battery can 45 made of metal and the extension portion 1b that extends outward from one side edge of the battery can 45 is used. A part of the antenna coil 5 was formed on the extension portion 1b and the magnetic sheet 4 was adhered to extension portion 1b. Also in the present example, the communication characteristics were evaluated when the relative positional relationship between the coil module 1 and the reader/writer 41 was changed while causing the coil module 1 and the reader/writer 41 to face each other.

The specific evaluation conditions regarding the reader/writer 41, the battery can 45, the reinforcement plate 53, and the distance from the antenna 43 of the reader/writer 41 to the antenna coil 5 were the same as those of the comparative example described above. The antenna coil 5 of the coil module 1 was a 1.5-mm-pitch two-winding coil having an external dimension of 33.3 mm×60 mm, which was defined in the XY axis direction, so that the area of the antenna coil 5 was substantially identical to that of the antenna coil 51 according to the comparative example. As the magnetic sheet 4, a ferrite sheet was used which had an impermeability of 120 and a thickness of 0.2 mm that were identical to those of the magnetic sheet 52 according to the comparative example and which was coated by a protective film. The magnetic sheet 4 was adhered to the extension portion 1b of the coil module 1 through an adhesive layer. In the magnetic sheet 4 according to the example, the amount of ferrite was reduced to 20% of that of the magnetic sheet 52 according to the comparative example.

In the example, the magnetic sheet 4 was not provided on the overlap portion 1a that overlaps with the battery can 45, so that the distance between the main surface 45a of the battery can 45 and the antenna coil 5 was 0.1 mm. In other words, according to the configuration of the example, the thickness was reduced by 0.4 mm in the thickness direction of the battery can 45 as compared with the configuration of the comparative example. This is because according to the example, in addition to the thickness of the magnetic sheet 4, the thicknesses of the protective film that protects the magnetic sheet 4 and the adhesive layer that attaches the magnetic sheet 4 can be reduced as compared with the comparative example.

Further, in the example, the battery can 45 and the coil module 1 were overlapped in this order on a reinforcement plate 53 made of stainless steel, which was regarded as the electronic device housing. As a value representing a relative positional relationship between the reader/writer 41 and the antenna coil 5, in the same manner as in the comparative example, when an axis line 43a in the Z axis direction passing through the center of the antenna 43 of the reader/writer 41 and an axis line 5a in the Z axis direction passing through the center of the antenna coil 5 were assumed, a distance "a" between the two axes lines 43a and 5a when the reader/writer 41 was moved in the Y axis direction indicated by an arrow in FIG. 14 from a position where the two axes lines 43a and 5a coincide with each other was used.

Figure 16:
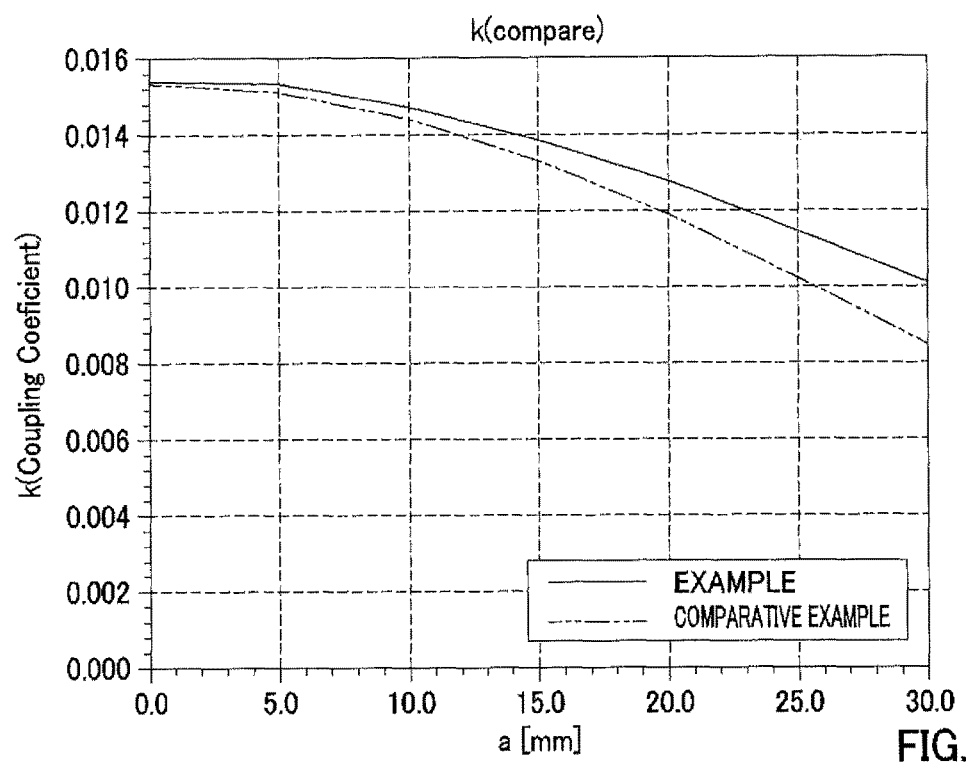
FIG. 16 is a graph showing a correlation between a coupling coefficient and a moving distance of a reader/writer of the example and the comparative example.
Figure 17A:
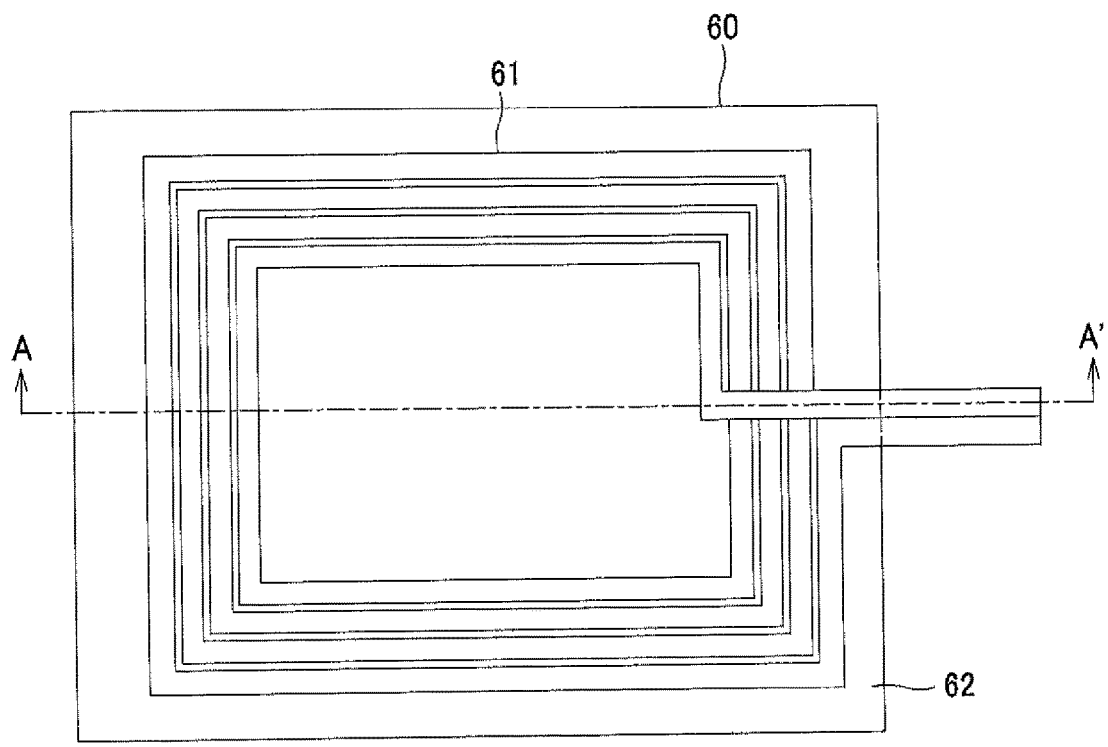
FIG. 17A is a plan view showing a conventional antenna module.
Figure 17B:
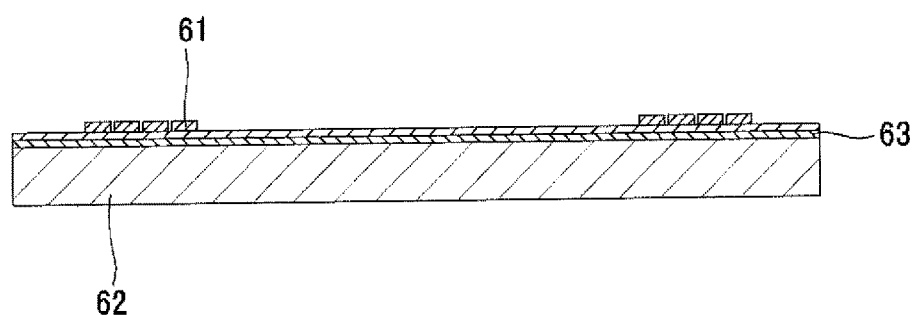
FIG. 17B is a cross-sectional view of the conventional antenna module in the thickness direction.
Figure 18:
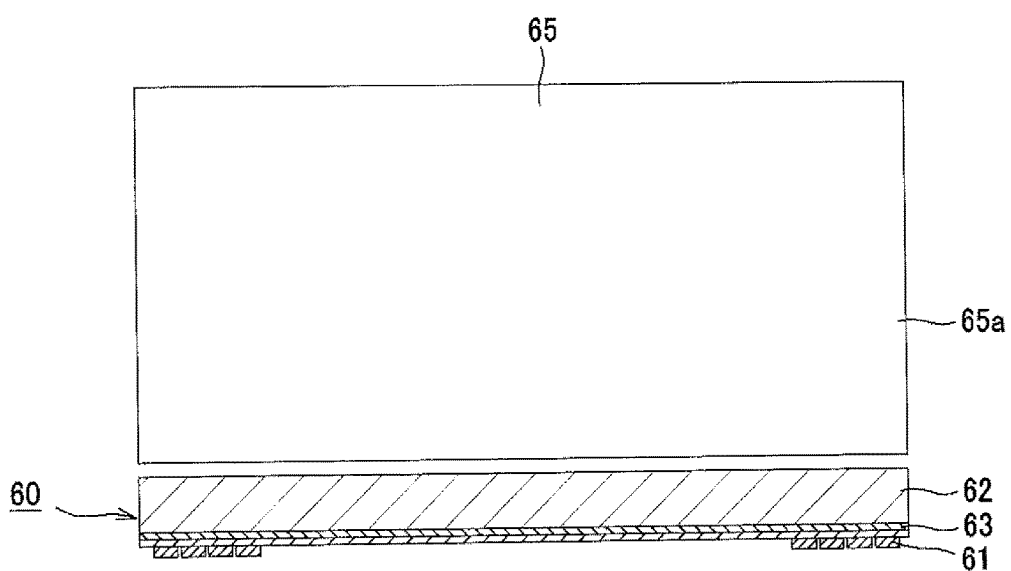
FIG. 18 is a cross-sectional view showing the inside of an electronic device housing that uses a conventional antenna module.

Under the condition as described above, the coupling coefficient of the antenna coil 5 when the value of "a" was changed from 0 mm to 30 mm was obtained by simulation. The variation of the coupling coefficient is shown in FIG. 16. According to the example, it is known that the coupling coefficient was improved as compared with the comparative example. This is partly because the reader/writer 41 was moved in the longitudinal direction of the antenna coil 5 in the example, so that the example is more advantageous than the comparative example in which the reader/writer 41 was moved in the lateral direction of the antenna coil 51. However, it can be said that the example has the coupling coefficient at least equal to or greater than the coupling coefficient of the comparative example.

In summary, according to the configuration of the example, it is possible to provide an electronic device that uses a coil module which can be thinned in the thickness direction of the battery can 45 without losing the characteristics of the coil module and which can be mounted even in a narrowed space.

REFERENCE SYMBOLS 1 coil module, 1a overlap portion, 1b extension portion, 4 magnetic sheet, 5 antenna coil, 6 adhesive layer, 7 flexible substrate, 10 internal structure, 10a main surface, 10b end portion, 20 electronic device housing, 11 metallic foil, 11a adhesive layer, 11b high conductivity metal, 11c insulating layer, 11d end portion, 20a side wall, 20b, 20c housing member, 21a metal cover, 21b resin portion, 30 mobile phone, 40 wireless communication system, 41 reader/writer, 42 memory module, 43 antenna, 44 control substrate, 45 battery can, 45a main surface

The invention claimed is:

1. An electronic device comprising:
   a coil module including a loop coil wounded in a planar shape, which is formed on a surface of a non-magnetic flexible substrate, and a sheet-shaped magnetic sheet which is formed of a magnetic material and which overlaps with only a first part of the loop coil and which is adhered to a different surface of the non-magnetic flexible substrate,
   wherein in the coil module, a second part of the loop coil overlaps with an internal structure of a housing only through the non-magnetic flexible substrate and the magnetic sheet is provided in a position that does not overlap with the internal structure on a loop coil surface side that overlaps with the internal structure.

2. The electronic device according to claim 1, wherein a part or all of the internal structure is a metal body.

3. The electronic device according to claim 1, wherein in the coil module, one side extending from a center of the loop coil and/or the other side extending from the center of the loop coil are formed in a position that does not overlap with the internal structure and the magnetic sheet overlaps with the one side and/or the other side of the loop coil.

4. The electronic device according to claim 3, wherein the magnetic sheet overlaps with a part of the one side of the loop coil.

5. The electronic device according to claim 1, wherein in the coil module, a center of the loop coil is positioned at an outer edge of the internal structure.

6. The electronic device according to claim 1, wherein in the coil module, a portion which does not overlap with the internal structure is bent.

7. An electronic device comprising:
   a coil module including a loop coil wounded in a planar shape, which is formed on a surface of a non-magnetic flexible substrate, and a sheet-shaped magnetic sheet which is formed of a magnetic material and which overlaps with only a first part of the loop coil and which is adhered to a different surface of the non-magnetic flexible substrate; and
   a conductor that overlaps with a second part of the loop coil only through the non-magnetic flexible substrate, wherein the magnetic sheet is provided in a position which does not overlap with the conductor and which is on a surface opposite to a loop coil surface that overlaps with the conductor.

8. The electronic device according to claim 7, wherein a part of the conductor is overlapped with or connected to an internal structure of a housing.

9. The electronic device according to claim 8, wherein a part or all of the internal structure is a metal body.

10. The electronic device according to claim 7, wherein in the coil module, one side of a center of the loop coil and/or the other side of the center of the loop coil are formed in a position that does not overlap with the conductor, and
    the magnetic sheet overlaps with the one side and/or the other side of the loop coil.

11. The electronic device according to claim 10, wherein the magnetic sheet overlaps with a part of the one side of the loop coil.

12. The electronic device according to claim 7, wherein in the coil module, a center of the loop coil is arranged to an outer edge of the conductor.

13. The electronic device according to claim 7, wherein in the coil module, a portion which does not overlap with the conductor is bent.

14. An antenna device which is included in an electronic device and communicates with an external device through an electromagnetic field signal, the antenna device comprising:
    a coil module which is provided on an inner surface of one member that forms a housing of the electronic device and which includes a loop coil wounded in a planar shape, which is formed on a surface of a non-magnetic flexible substrate, and a sheet-shaped magnetic sheet which is formed of a magnetic material and which overlaps with only a first part of the loop coil and which is adhered to a different surface of the non-magnetic flexible substrate; and
    a conductor that forms a part of the one member,
    wherein in the coil module, a second part of the loop coil overlaps with the conductor only through the non-magnetic flexible substrate and the magnetic sheet is provided in a position that does not overlap with the conductor on a surface opposite to a loop coil surface that overlaps with the conductor.

15. The antenna device according to claim 14, wherein in the coil module, one side of a center of the loop coil and/or the other side of the center of the loop coil are formed in a position that does not overlap with the conductor and the magnetic sheet overlaps with the one side and/or the other side of the loop coil.

16. The antenna device according to claim 15, wherein the magnetic sheet overlaps with a part of the one side of the loop coil.

17. The antenna device according to claim 14, wherein in the coil module, a center of the loop coil is arranged to an outer edge of the conductor.

18. The antenna device according to claim 14, wherein in the coil module, a portion which does not overlap with the conductor is bent.

* * * * *